United States Patent Office
2,706,735
Patented Apr. 19, 1955

2,706,735

5-t-BUTYL-ISOPHTHALONITRILE

Louis L. Ferstandig, El Cerrito, Calif., assignor to California Research Corporation, San Francisco, Calif., a corporation of Delaware No Drawing. Application June 1, 1953, Serial No. 358,980

1 Claim. (Cl. 260—465)

This invention relates to a new and superior phthalonitrile, namely, 5-t-butyl-isophthalonitrile.

Phthalonitriles are valuable as plasticizers, pesticides and alkyd resin modifiers, and also as intermediates in the production of important chemicals such as diamines and diisocyanates having application in the synthetic plastics field. In the case of plasticizers, pesticides, alkyd resin modifiers, and the like, it is desirable that the phthalonitrile be generally compatible with other materials employed in such compositions. As intermediates in the production of important chemicals such as diamines and diisocyanates, the phthalonitriles must be capable of providing high yields of the desired product, while at the same time resisting side reactions which may result in a loss of reactants and the formation of difficultly separable contaminants in the product.

I have now discovered 5-t-butyl-isophthalonitrile, a novel phthalonitrile having a remarkable resistance to side reactions when employed as an intermediate in the production of important chemicals such as diamines and diisocyanates, as well as many other advantages over other phthalonitriles including a high degree of compatibility with materials generally employed in plasticizer and pesticide compositions.

The new and superior phthalonitrile of my invention has the following structural formula:

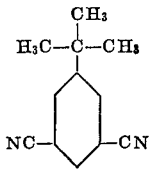

Although it has been termed "5-t-butyl-isophthalonitrile" for convenient reference in the present discussion, it may also be described as "1,3-dicyano-5-t-butyl-benzene" or "5-t-butyl-isophthalodinitrile."

The unusual and superior nature of the 5-t-butyl-isophthalonitrile of my invention may be attributed to its novel structure. An excellent illustration of this is found in the process of hydrogenating the 5-t-butyl-isophthalonitrile to obtain 5-t-butyl-m-xylene diamine, a valuable reactant in the production of synthetic plastics. Ordinarily, in the reduction of nitriles to amines, the imine intermediate tends to react with the amine product to form undesirable secondary amines (U. S. Patent No. 2,166,183). Aromatic nitriles seem particularly prone to such side reactions. In the case of the 5-t-butyl-isophthalonitrile of the present invention, however, the tertiary-butyl group effectively hinders the bi-molecular reactions between the imine intermediates and the amine product and results in greatly increased yields of the desired 5-t-butyl-m-xylene diamine while at the same time avoiding loss of reactant and the formation of contaminating by-products.

The 5-t-butyl-isophthalonitrile of this invention is most suitably prepared in accordance with the process of U. S. Patent Application Serial No. 358,848 filed June 1, 1953, of William G. Toland, Jr. and Joseph A. Fuller. This process takes into account the unusual structure of the isophthalic acids and their inability to form stabilized cyclic derivatives such as the anhydride or the imide of ortho-phthalic acid which causes them to decarboxylate under the conditions at which nitrile formation is conventionally carried out.

Suitable starting materials include 1,3,5-tertiary-butyl-isophthalic acid and its ammonium salts and amides. The ammonium salts are preferred since they are inert to ammonium atmosphere under which the feed is ordinarily introduced for convenience and thus avoid caking in the initial stages of the process.

The 1,3,5-tertiary-butyl-isophthalic acid or its ammonium salts or amides are fed to the process in solid form. These acids, ammonium salts or amides are vaporized in the presence of ammonia and a dehydrating catalyst. It is desirable that at least one equivalent of ammonia per acid salt or amide group be present and from about 5 to about 15 equivalents of ammonia are considered most satisfactory. The dehydrating catalysts are known to the art and have been described in texts, for example, "Catalysis" by Berkman, Morrell and Egloff. Activated alumina supported on Alundum was employed in the present experiments, but other catalysts such as silica, thoria, oxides of zirconium, beryllium, tungsten and vanadium and basic aluminum sulfate as well as fluid beds are also considered satisfactory.

Any temperature sufficient to maintain the 1,3,5-tertiary-butyl-isophthalic acid, its ammonium salts or amides in a vapor state may be employed. Temperatures of 600 to 900° F. are considered particularly suitable, while temperatures in the range from 700 to 800° F. are preferred for present purposes. Although atmospheric pressures are most convenient under which to operate, the reaction may also be carried out at superatmospheric or subatmospheric pressures.

In further illustration of the 5-t-butyl-isophthalonitrile of the invention, the following example is submitted. The proportions given are on a weight basis unless otherwise specified.

*Example*

104 g. of 5-t-butyl-isophthalic acid (1,3,5-t-butyl-isophthalic acid) were finely ground and placed in a 1 liter reaction flask equipped with a stirrer and gas inlet and outlet tubes. Ammonia gas was passed into the stirred solid until no more was absorbed as evidenced by the change in gas flow through the exit bubbler and by the lack of heat from the exothermic reaction.

The ammonium salt of 5-t-butyl-isophthalic acid prepared above was fed at a rate of about 2 to 3 g. per minute to a stainless steel reactor containing 100 ml. of activated alumina supported on Alundum. Ammonia gas was passed in at 6 g. per minute. The reactor temperature was maintained between 725 and 750° F. A total of 80 g. of product was collected from the gases coming out of the reactor by means of traps. This product represented a 92.9% by weight yield of theoretical.

The 5-t-butyl-isophthalonitrile obtained above had a melting point of 137–139° C. The material was recrystallized from methanol to give a white crystalline solid having a melting point of 138.9–139.6° C. The product had the following elemental analysis:

| | Calculated | Found |
|---|---|---|
| C | 78.26 | 78.23 |
| H | 6.57 | 6.46, 6.66 |
| N | 15.23 | 15.21, 15.09 |

As an illustration of its effectiveness as an intermediate of the production of xylylene diamine, the 5-t-butyl-isophthalonitrile of the invention was hydrogenated. 18.4 g. of 5-t-butyl-isophthalonitrile were dissolved in 175 g. of acetic acid and 10 g. of concentrated sulfuric acid were added. 1 g. of 5% palladium on charcoal was added and the mixture was reduced in a shaker bomb under pressure of 1300 pounds of hydrogen at a temperature of 165° F. The bomb was cooled and the diamine sulfate salt was separated and dissolved in 90 ml. of water heated to boiling. 29.4 g. of barium hydroxide octahydrate were added to precipitate barium sulfate and give a clear aqueous solution of 5-t-butyl-1,3-xylene diamine (5-tertiary-butyl-m-xylene diamine). The water was removed by distillation at reduced pressure. The distillation was then continued to obtain 15.9 g. of the pure diamine corresponding to a yield of 82% based on the crude dinitrile. Less than 1% of secondary amine was formed as measured by the bottoms obtained in the distillation.

For the purpose of comparison isophthalonitrile and terephthalonitrile were hydrogenated in an identical manner as above to produce meta-xylylene diamine and para-xylylene diamine, respectively. A yield of only 71% of meta-xylylene diamine was obtained with the formation of 5% secondary amine. Para-xylylene diamine was obtained in a yield of only 73%, while 7% of secondary amine was formed.

The high degree of solubility or compatibility of the 5-t-butyl-isophthalonitrile of this invention was demonstrated in a simple experiment by dissolving as much of it as possible in benzene. At a temperature of 25° C. it was found that approximately 20 g. of 5-t-butyl-isophthalonitrile were soluble in 100 g. of benzene. On the other hand, isophthalonitrile, by way of comparison, was soluble only to the extent of 1.5 g. in 100 g. of benzene at the same temperature.

I claim:

5-t-butyl-isophthalonitrile.

No references cited.